(12) United States Patent
Takasu

(10) Patent No.: US 8,686,611 B2
(45) Date of Patent: Apr. 1, 2014

(54) MOTOR

(75) Inventor: Yoshimi Takasu, Nagano (JP)

(73) Assignee: Nidec Sankyo Corporation (JP)

( * ) Notice: Subject to any disclaimer, the term of this patent is extended or adjusted under 35 U.S.C. 154(b) by 148 days.

(21) Appl. No.: 13/448,867

(22) Filed: Apr. 17, 2012

(65) Prior Publication Data

US 2012/0267968 A1 Oct. 25, 2012

(30) Foreign Application Priority Data

Apr. 19, 2011 (JP) ................................ 2011-093186

(51) Int. Cl.
*H02K 5/16* (2006.01)
(52) U.S. Cl.
USPC ......................................... 310/90; 310/49.01
(58) Field of Classification Search
USPC .......................................... 310/90, 91, 49.01
See application file for complete search history.

(56) References Cited

U.S. PATENT DOCUMENTS

| | | | | |
|---|---|---|---|---|
| 6,541,886 B2* | 4/2003 | Mayumi | ......................... | 310/91 |
| 7,420,303 B2* | 9/2008 | Nishimura | ...................... | 310/90 |
| 7,960,882 B2* | 6/2011 | Fukuzawa | ......................... | 310/90 |
| 2004/0164631 A1* | 8/2004 | Suzuki et al. | ................... | 310/90 |
| 2007/0035190 A1* | 2/2007 | Ueno | ................................. | 310/90 |
| 2007/0085433 A1* | 4/2007 | Agematsu | ......................... | 310/90 |
| 2007/0222313 A1* | 9/2007 | Sonohara et al. | ................. | 310/90 |

FOREIGN PATENT DOCUMENTS

JP 2007-20346 A 1/2007

* cited by examiner

*Primary Examiner* — Nguyen N Hanh
(74) *Attorney, Agent, or Firm* — Cantor Colburn LLP

(57) ABSTRACT

A motor may include a motor main body and an urging member. The urging member is provided with an end plate part having a plate spring part for urging the rotor and an engaging plate part which is extended along an outer peripheral face of a tube-like body part structuring an outer peripheral face of the motor main body. The engaging plate part is provided with a side plate part extended from the end plate part along the outer peripheral face of tube-like body part, a hook part which is bent from a tip end part of the side plate part to an inner side and is engaged with an opening part which is formed in the tube-like body part, and a pawl part which is bent from a tip end part of the hook part and is engaged with an inner peripheral face of the tube-like body part.

13 Claims, 13 Drawing Sheets

Fig. 6(a)
Fig. 6(c)
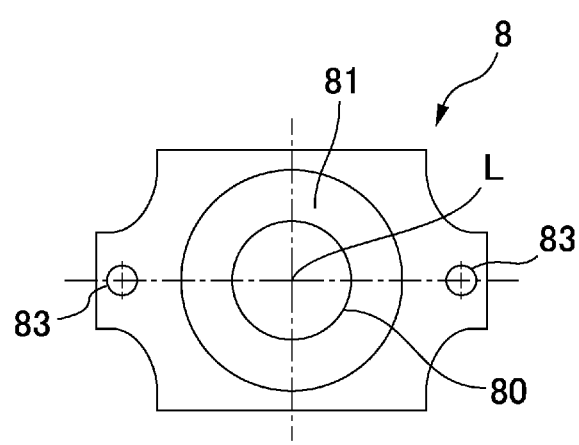
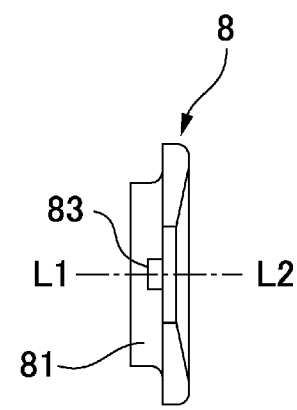
Fig. 6(b)
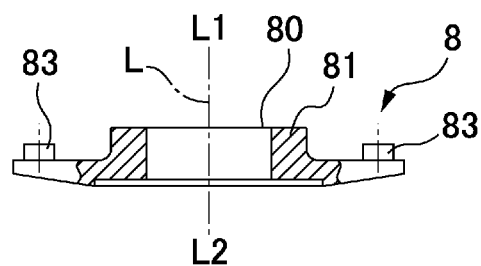

MOTOR

CROSS REFERENCE TO RELATED APPLICATION

The present invention claims priority under 35 U.S.C. §119 to Japanese Application No. 2011-093186 filed Apr. 19, 2011, the entire content of which is incorporated herein by reference.

FIELD OF THE INVENTION

At least an embodiment of the present invention may relate to a motor. Specifically, at least an embodiment of the present invention may relate to a fixing structure of an urging member, which urges a rotor in a motor axial line direction, to a motor main body.

BACKGROUND

A stepping motor or the like which is used in a digital camera, a digital video camera, an FDD, an ODD and the like includes a motor main body which is provided with a rotor provided with a permanent magnet on an outer peripheral face of a rotation shaft and a stator disposed on an outer peripheral side of the rotor, and an urging member which urges the rotor to one side in a motor axial line direction (see Japanese Patent Laid-Open No. 2007-20346).

In the motor described in the Patent Literature, in order to fix the urging member to the motor main body, as shown in FIG. 13, an opening part 10c is formed in a tube-like body part 10 of a motor main body and an urging member 9 is formed with an engaging plate part 94 extended along an outer peripheral face 10a of the tube-like body part 10 toward one side "L1" in a motor axial line "L" direction. A tip end part 940 of the engaging plate part 94 is bent to an inner side and the tip end part 940 is engaged with the opening part 10c in the motor axial line "L" direction.

However, in the structure shown in FIG. 13, when an impact toward the other side "L2" in the motor axial line "L" direction is applied to the rotor, the engaging plate part 94 is pulled to the other side "L2" in the motor axial line "L" direction and, as a result, the tip end part 940 of the engaging plate part 94 may be deformed so as to be opened as shown by the arrow "F1" and the engaging plate part 94 is disengaged from the opening part 10c. Therefore, in the structure shown in FIG. 13, the impact resistance performance of the motor is not satisfactory.

SUMMARY

In view of the problem described above, at least an embodiment of the present invention may advantageously provide a motor in which the urging member for urging the rotor to one side in the motor axial line direction is hard to be disengaged from the motor main body even when an impact is applied from the outside.

According to at least an embodiment of the present invention, there may be provided a motor including a motor main body provided with a rotor having a rotation shaft and a stator disposed on an outer peripheral side of the rotor and an urging member which urges the rotor to one side in a motor axial line direction. A tube-like body part structuring an outer peripheral face of the motor main body is formed with an opening part which is opened toward an outer side in a radial direction. The urging member includes an end plate part which is provided with a plate spring part for urging the rotor and is located on the other side with respect to the tube-like body part in the motor axial line direction, and an engaging plate part which is extended toward the one side in the motor axial line direction from the end plate part along an outer peripheral face of the tube-like body part. The engaging plate part includes a side plate part which is extended from the end plate part toward the one side in the motor axial line direction along the outer peripheral face of tube-like body part, a hook part which is bent from a tip end part of the side plate part to an inner side in a radial direction and is engaged with a wall face of the opening part located on the other side in the motor axial line direction, and a pawl part which is bent from a tip end part of the hook part toward the other side in the motor axial line direction on an inner side of the tube-like body part.

In accordance with at least an embodiment of the present invention, an opening part is formed in a tube-like body part of the motor main body, the urging member is provided with an engaging plate part extending toward one side in the motor axial line direction along an outer peripheral face of the tube-like body part, and a tip end side of the engaging plate part is engaged with the opening part to attach the urging member to the motor main body. In addition, the engaging plate part is provided with a hook part, which is bent from a tip end part of the side plate part to an inner side in a radial direction and is engaged with a wall face of the opening part located on the other side in the motor axial line direction, and a pawl part which is bent from a tip end part of the hook part toward the other side in the motor axial line direction on an inner side of the tube-like body part. Therefore, in the engaging plate part of the urging member, the hook part is engaged with the tube-like body part in the motor axial line direction and the pawl part is engaged with the tube-like body part in the radial direction. Accordingly, even when the engaging plate part is deformed due to an impact which is applied from the outside, the pawl part is engaged with the inner peripheral face of the tube-like body part and thus the engaging plate part is hard to be disengaged from the opening part. As a result, the impact resistance performance of the motor is enhanced.

In accordance with at least an embodiment of the present invention, the opening part and the engaging plate part are respectively provided at plural positions separated from each other in a circumferential direction. According to this structure, the urging member is fixed to the motor main body by using the opening part and the engaging plate part.

In accordance with at least an embodiment of the present invention, the pawl part is curved in the circumferential direction along an inner peripheral face of the tube-like body part. In this case, it is preferable that the pawl part is concentrically curved with the inner peripheral face of the tube-like body part. According to this structure, even when a coil is located on an inner side of the tube-like body part, a sufficient gap space is secured between the coil and the pawl part and thus the pawl part is surely prevented from being contacted with the coil.

In accordance with at least an embodiment of the present invention, the pawl part is partly formed in the tip end part of the hook part in the circumferential direction.

In this case, for example, it is preferable that the pawl part is formed at both end parts in the circumferential direction of the tip end part of the hook part. According to this structure, even when a torsional force is applied to the pawl part, the engaging plate part is hard to be disengaged from the opening part.

Further, a structure may be adopted in which the pawl part is formed at a center position in the circumferential direction of the tip end part of the hook part. According to this structure, even when a coil is located on an inner side of the tube-like body part, a sufficient gap space is secured between the coil and the pawl part.

In accordance with at least an embodiment of the present invention, a cut-out part is formed on a side edge of the side plate part. When the pawl part is provided in the engaging plate part, at the time of reworking, time and labor are required for disengaging the engaging plate part from the opening part. However, according to this structure, since a cut-out part is formed on a side edge of the side plate part, when the motor is to be reworked, the engaging plate part is easy to be forcibly resiliently bent to an outer side by engaging a jig with the cut-out part of the engaging plate part and thus the engagement of the engaging plate part with the opening part is released.

In accordance with at least an embodiment of the present invention, the stator includes a bobbin around which a coil is wound, the opening part formed in the tube-like body part is provided at a position located on an outer peripheral face of the coil wound around the bobbin, and a gap space is formed between the pawl part of the engaging plate part and the outer peripheral face of the coil when the hook part of the engaging plate part is engaged with the opening part of the tube-like body part. According to this structure, the pawl part of the engaging plate part can be attached without abutting with an outer peripheral face of the coil by utilizing a gap space which is originally existed between the tube-like body part and the outer peripheral face of the coil wound around the bobbin or by increasing the gap space between the tube-like body part and the outer peripheral face of the coil.

In accordance with at least an embodiment of the present invention, the tube-like body part is integrally formed with a stator core used in the stator. According to this structure, the outer peripheral face of the motor main body is structured by using the tube-like body part which is integrally formed with the stator core. Specifically, it may be structured that the stator is structured so that a first bobbin and a second bobbin around each of which a coil is wound are superposed on each other in the motor axial line direction, the stator core of the stator is structured so that a plurality of pole teeth of an inner stator core and an outer stator core is juxtaposed to each other in the circumferential direction on respective inner peripheral sides of the first bobbin and the second bobbin, the outer stator core disposed on the one side in the motor axial line direction is formed so that the other side in the motor axial line direction of the outer stator core is opened to be an open end and is formed as a cup-shaped outer stator core having the tube-like body part which covers an outer peripheral side of the first bobbin and the second bobbin, the outer stator core disposed on the other side in the motor axial line direction is disposed so as to close the open end of the cup-shaped outer stator core, and the opening part is provided in the tube-like body part of the cup-shaped outer stator core.

In accordance with at least an embodiment of the present invention, the rotation shaft is supported by a bearing which is movably held by a through hole of a bearing holding member in the motor axial line direction, the bearing holding member is disposed so that at least a part of the bearing holding member is overlapped with the stator in the motor axial line direction, and the end plate part of the urging member is abutted with the bearing holding member on an inner side in a radial direction with respect to the rotation shaft and, on an outer side in the radial direction, a gap space is formed between the bearing holding member and the stator in the motor axial line direction. According to this structure, the end plate part of the urging member is provided with a gap space in the motor axial line direction at an outer position between the bearing holding member and the stator, engagement of the engaging plate part with the tube-like body part in the motor axial line "L" direction is surely held by utilizing resiliently bending of the end plate part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 6(a), 6(b) and 6(c) are explanatory views showing a bearing holding member of the motor shown in FIGS. 1(a) and 1(b).

DETAILED DESCRIPTION OF THE PREFERRED EMBODIMENTS

An example of a motor to which the present invention is applied will be described below with reference to the accompanying drawings. In the following descriptions, the present invention is applied to a stepping motor as an example in various motors.

[First Embodiment]

Figure 1A:
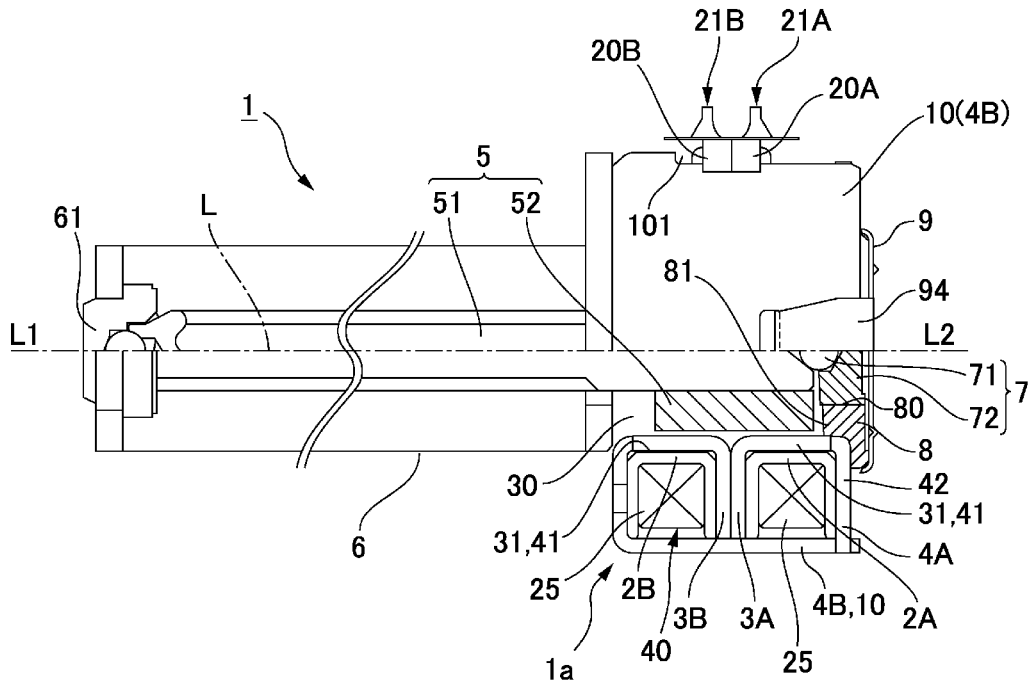
FIGS. 1(a) and 1(b) are explanatory views showing an entire structure of a motor (stepping motor) in accordance with a first embodiment of the present invention.
Figure 1B:
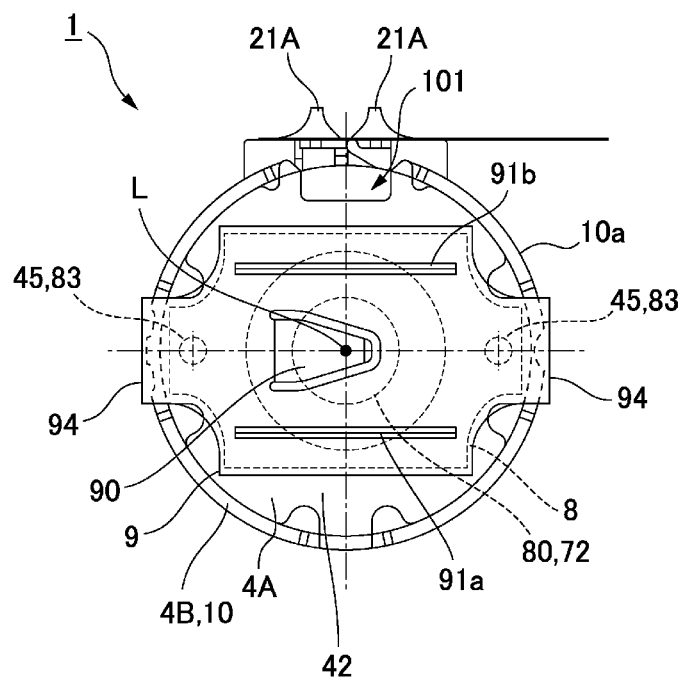
Figure 2A:
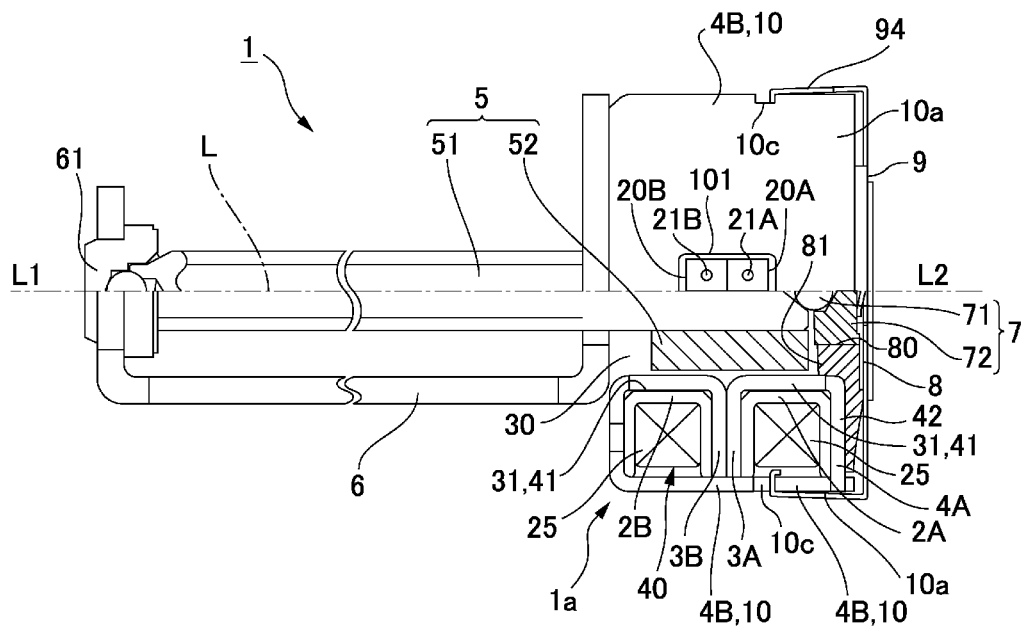
FIGS. 2(a) and 2(b) are explanatory views showing a fixing structure of an urging member to a motor main body in the motor in accordance with the first embodiment of the present invention.
Figure 2B:
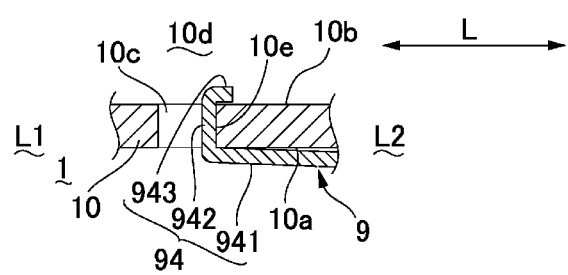
Figure 3:
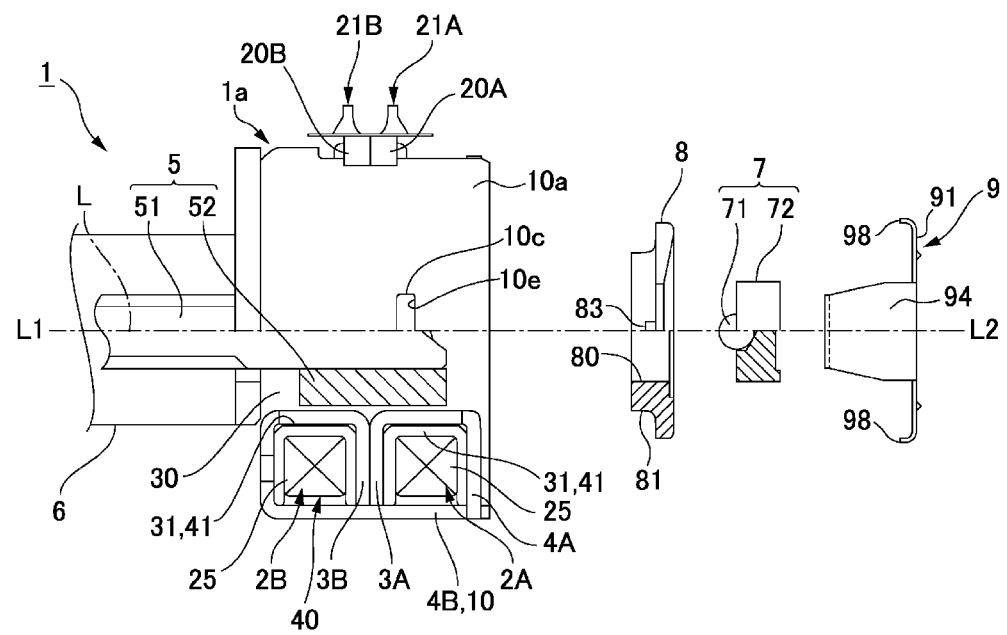
FIG. 3 is an exploded explanatory view showing a base end side of the motor in accordance with the first embodiment of the present invention.

FIGS. 1(a) and 1(b) are explanatory views showing an entire structure of a stepping motor in accordance with a first embodiment of the present invention. FIG. 1(a) is a half sectional view showing a stepping motor and FIG. 1(b) is its bottom view. FIGS. 2(a) and 2(b) are explanatory views showing a fixing structure of an urging member to a motor main body in the stepping motor in accordance with the first embodiment of the present invention. FIG. 2(a) is a half sectional view showing the stepping motor which is viewed in a direction perpendicular to the direction shown in FIG. 1(a) and FIG. 2(b) is an enlarged cross-sectional view showing a fixing portion of the urging member to the motor main body. FIG. 3 is an exploded explanatory view showing a base end side of the stepping motor in accordance with the first embodiment of the present invention.

In FIGS. 1(a) and 1(b), FIG. 2(a) and FIG. 3, a motor 1 in this embodiment is a small stepping motor which is used in a digital camera, a digital video camera, an FDD, an ODD or the like. A rotation shaft 51 of a rotor 5 is protruded from a motor main body 1a, which includes the rotor 5 and a stator 40, to one side "L1" (output side) in a motor axial line "L" direction.

In the stator 40 of the motor 1, a first bobbin 2A and a second bobbin 2B which are respectively formed in a ring-like shape and around which a coil 25 is wound are disposed so as to be superposed on each other in the motor axial line "L" direction. A plurality of pole teeth 31 of inner stator cores 3A and 3B and a plurality of pole teeth 41 of outer stator cores 4A and 4B are juxtaposed to each other in a circumferential direction on inner peripheral faces of the first bobbin 2A which is located on the other side "L2" (opposite-to-output side) in the motor axial line "L" direction and the second bobbin 2B which is located on the one side "L1" (output side) in the motor axial line "L" direction. In this manner, a ring-shaped stator 40 provided with a rotor arrangement hole 30 is structured and a base end side of the rotor 5 is coaxially disposed on an inner side of the rotor arrangement hole 30. The rotor 5 includes a permanent magnet 52 around the base end side of the rotation shaft 51 and the permanent magnet 52 is oppositely disposed to the pole teeth 31 and 41 of the stator on the inner side of the rotor arrangement hole 30 through a predetermined gap space.

In this embodiment, in the outer stator cores 4A and 4B, an outer peripheral face of the motor main body 1a is structured by using a tube-like body part 10 in a cylindrical tube shape which is integrally formed in the outer stator core 4B which is located on the one side "L1" (output side) in the motor axial line "L" direction. The coils 25 and the inner stator cores 3A and 3B are disposed in the inside of the tube-like body part 10. In other words, the outer stator core 4B which is located on the one side "L1" (output side) in the motor axial line "L" direction is provided with the tube-like body part 10 which entirely covers the first bobbin 2A and the second bobbin 2B in the radial direction around which the coil 25 is wound. The outer stator core 4B structured as described above is formed in a cup shape whose other side "L2" in the motor axial line "L" direction (opposite-to-output side) is opened and the outer stator core 4A is disposed so as to close an open end of the outer stator core 4B (open end of the tube-like body part 10). Further, a tip end face of the outer stator core 4B which is located on the one side "L1" in the motor axial line "L" direction is fixed with a U-shaped plate 6 and a rotation shaft 51 of the rotor 5 is supported by a thrust bearing 61 which is held by a bent portion on a tip end side of the plate 6. Further, the rotation shaft 51 is also supported by a bearing 7 which is disposed on the other side "L2" (opposite-to-output side) in the motor axial line "L" direction. The bearing 7 includes a steel ball 71 and a main body part 72 made of resin which rotatably holds the steel ball 71. In this embodiment, a bearing holding member 8 which is made of resin and is formed in a plate-like shape is disposed so that at least a part of the bearing holding member 8 is overlapped with the stator 40 on the other side "L2" with respect to the stator 40. The bearing 7 is held in a movable state in the through hole 80 of the bearing holding member 8 in the motor axial line "L" direction.

Further, an urging member 9 formed of a thin metal plate is disposed on further the other end side with respect to the bearing holding member 8 so that at least a part of the urging member 9 is overlapped with the bearing holding member 8. The bearing 7 in the through hole 80 is urged toward the rotation shaft 51 by a plate spring part 90 which is cut and bent from the urging member 9. As a result, the rotor 5 is urged toward the one side "L1" in the motor axial line "L" direction by the urging member 9 and thus rattling does not occur in the rotation shaft 51. In this embodiment, the plate spring part 90 is abutted at a position which is displaced from the center of the main body part 72 of the bearing 7. The urging member 9 is held by the tube-like body part 10 through an engagement mechanism which will be described below and the bearing holding member 8 is clamped between the motor main body 1a and the urging member 9 in a state that the bearing 7 is inserted into the through hole 80.

Terminal parts 20A and 20B are structured on an outer side in a radial direction of the first bobbin 2A and the second bobbin 2B and the terminal parts 20A and 20B are protruded from a hole 101 which is formed in an outer peripheral face 10a of the tube-like body part 10. Coil ends of the windings are electrically connected with terminal pins 21A and 21B of the terminal parts 20A and 20B.

Figure 4:
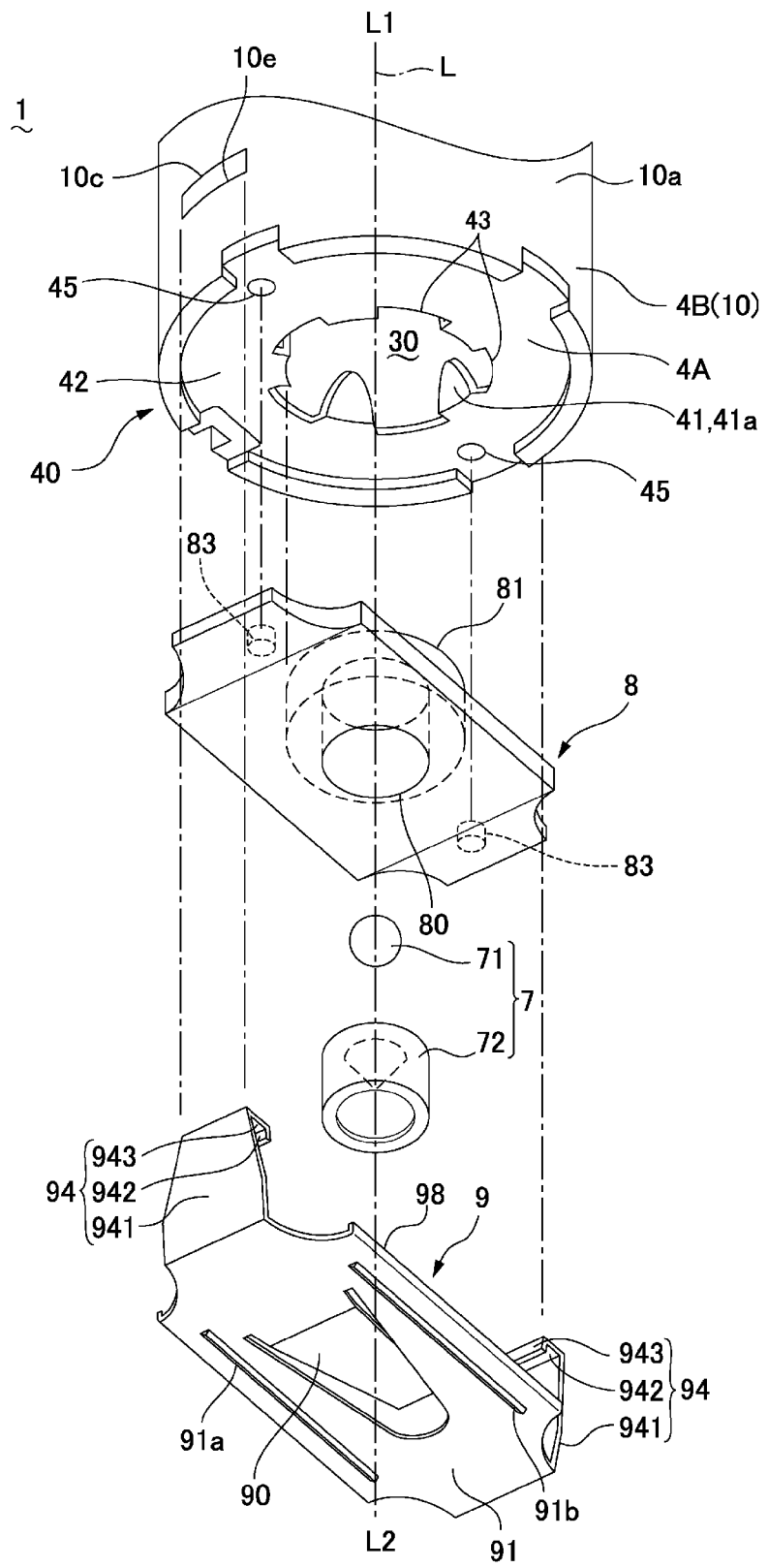
FIG. 4 is an exploded perspective view schematically showing a part of the motor shown in FIGS. 1(a) and 1(b).
Figure 5A:
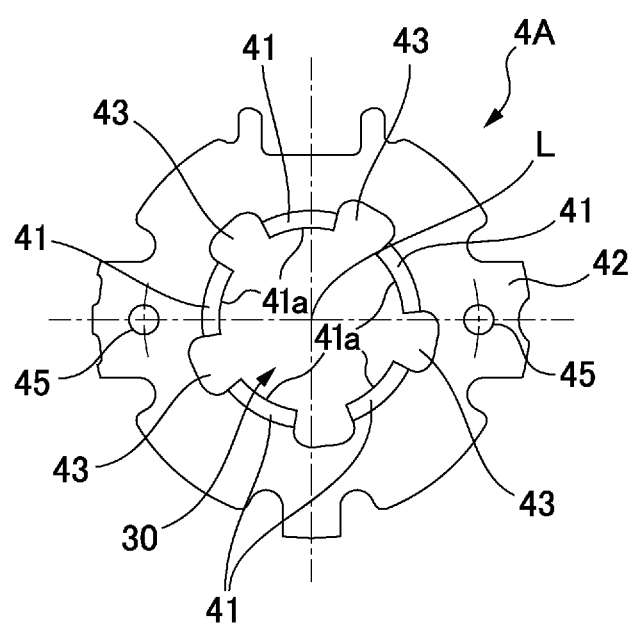
FIGS. 5(a), 5(b) and 5(c) are explanatory views showing an outer stator core of the motor shown in FIGS. 1(a) and 1(b).
Figure 5C:
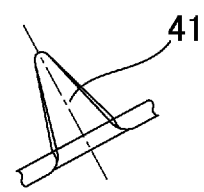
Figure 5B:
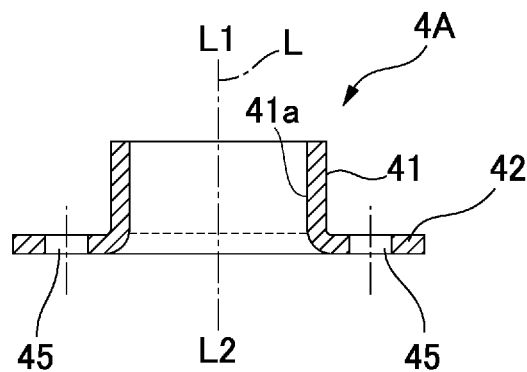

FIG. 4 is an exploded perspective view schematically showing a part of the motor 1 shown in FIGS. 1(a) and 1(b). FIGS. 5(a), 5(b) and 5(c) are explanatory views showing an outer stator core 4A of the motor 1 shown in FIGS. 1(a) and 1(b). FIG. 5(a) is a plan view showing the outer stator core 4A, FIG. 5(b) is its longitudinal sectional view, and FIG. 5(c) is an explanatory view showing a pole tooth 41. FIGS. 6(a), 6(b) and 6(c) are explanatory views showing the bearing holding member 8 of the motor 1 shown in FIGS. 1(a) and 1(b). FIG. 6(a) is a plan view showing the bearing holding member 8, FIG. 6(b) is its partly cross sectional front view and FIG. 6(c) is its side view.

In this embodiment, in order to fix the bearing holding member 8 and the urging member 9 to the motor main body 1a in this order, the following structure is adopted. First, as shown in FIG. 4 and FIGS. 5(a) through 5(c), the outer stator core 4A is provided with a bottom plate portion 42 in a roughly ring shape which is located on an end side of the tube-like body part 10 and five pole teeth 41 which are stood up from an inner circumferential edge of the bottom plate portion 42. The pole teeth 41 are formed with an equal angular interval and inner peripheral faces 41a of the pole teeth 41 are, as shown in FIG. 5(a), formed in a circular arc shape located on a concentric circle with the motor axial line "L" direction as a center. Cut-out parts 43 are respectively formed between respective pole teeth 41 in the inner circumferential edge of the bottom plate portion 42 of the outer stator core 4A and the pole teeth 31 of the inner stator core 3A shown in FIG. 3 are extended to the cut-out parts 43. In this manner, the pole teeth 31 of the inner stator core 3A and the pole teeth 41 of the outer stator core 4A are alternately juxtaposed to each other in the circumferential direction. The bottom plate portion 42 is formed with two holes 45 (first fitting hole) for positioning of the bearing holding member 8 and the holes 45 are formed at symmetrical positions so as to interpose the rotor arrangement hole 30 with the motor axial line "L" direction as a center.

As shown in FIG. 4 and FIGS. 6(a) through 6(c), the bearing holding member 8 is a resin molded product and its planar shape is provided with a shape in which four corners of a substantially rectangular shape are cut out in a circular arc shape. A thickness of both of outer side portions of the bearing holding member 8 is set to be smaller than a thickness of its rectangular center part and, as shown in FIG. 2(a), a face of the bearing holding member 8 located on the other side "L2" (opposite-to-output side) in the motor axial line "L" direction is formed so as to be inclined to the outer stator core 4A side. A center of the bearing holding member 8 is formed with the circular through hole 80 into which the bearing 7 is inserted. A face of the bearing holding member 8 facing the bottom plate portion 42 of the outer stator core 4A is formed with a ring-shaped protruded part 81 which is protruded so as to surround an opened edge of the through hole 80. An outer diameter of the ring-shaped protruded part 81 is set to be slightly smaller than a diameter of an inscribed circle with the inner peripheral faces 41a of the pole teeth 41 of the outer stator core 4A and the protruding dimension of the ring-shaped protruded part 81 is set to be sufficiently shorter than a dimension of the pole tooth 41. Therefore, when the motor 1 is assembled, the ring-shaped protruded part 81 is fitted to the inner side of the pole teeth 41 of the outer stator core 4A and the bearing holding member 8 is radially positioned with respect to the outer stator core 4A (tube-like body part 10). In this state, the protruding dimension of the ring-shaped protruded part 81 is sufficiently shorter than the dimension of the pole teeth 41 and thus the ring-shaped protruded part 81 and the rotor 5 are not abutted with each other.

Further, a face of the bearing holding member 8 facing the outer stator core 4A is formed with two protruded parts 83 which are protruded toward the outer stator core 4A at positions on both sides interposing the through hole 80. Therefore, when the motor 1 is assembled, two protruded parts 83 of the bearing holding member 8 are fitted to two holes 45 of the outer stator core 4A for positioning and thus an angular position of the bearing holding member 8 with respect to the stator 40 is determined.

Figure 7A:
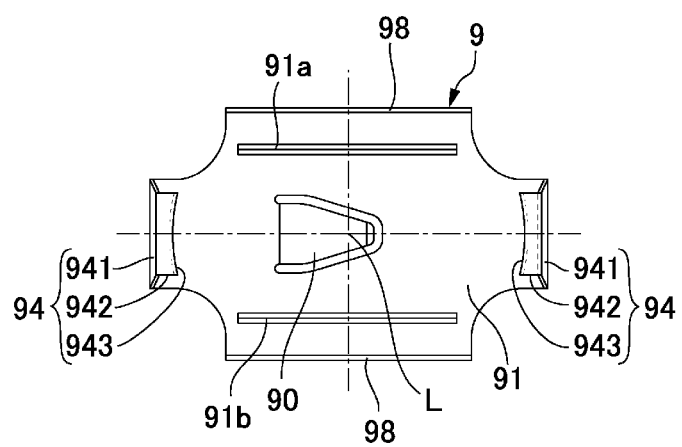
FIGS. 7(a), 7(b), 7(c) and 7(d) are explanatory views showing an urging member of the motor shown in FIGS. 1(a) and 1(b).
Figure 7C:
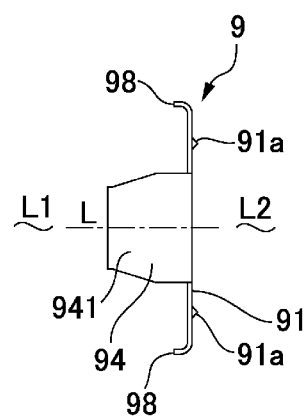
Figure 7B:
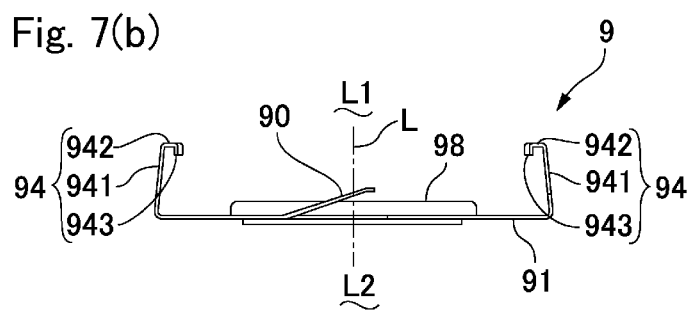
Figure 7D:
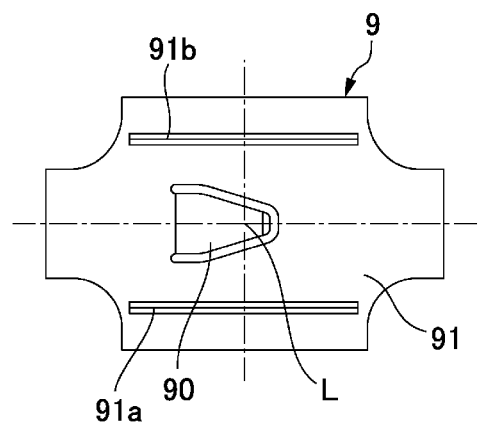
Figure 8A:
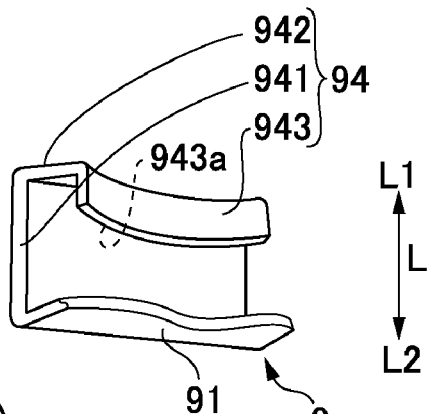
FIGS. 8(a), 8(b), 8(c) and 8(d) are explanatory views showing a structure and the like on a tip end side of an engaging plate part of the urging member shown in FIGS. 7(a), 7(b), 7(c) and 7(d).
Figure 8B:
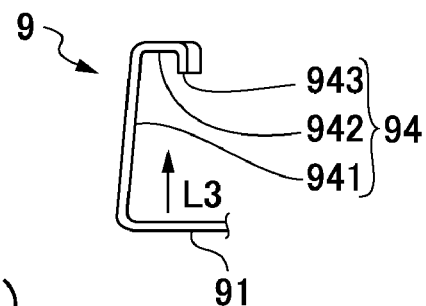
Figure 8C:
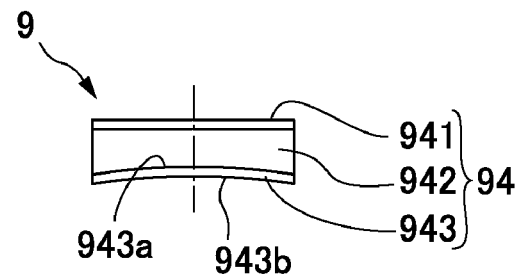
Figure 8D:
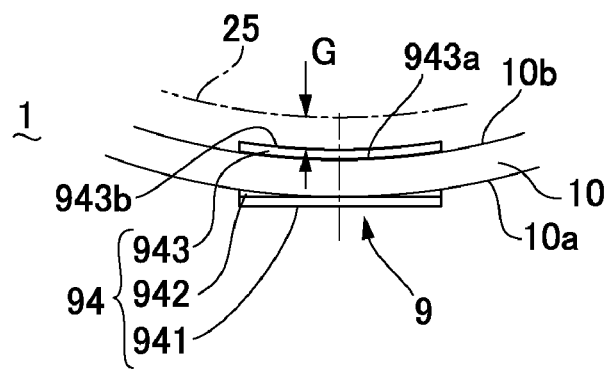
Figure 9A:
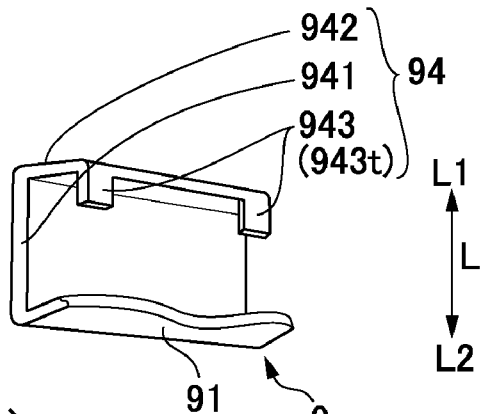
FIGS. 9(a), 9(b), 9(c) and 9(d) are explanatory views showing an urging member of a motor in accordance with a second embodiment of the present invention.
Figure 9B:
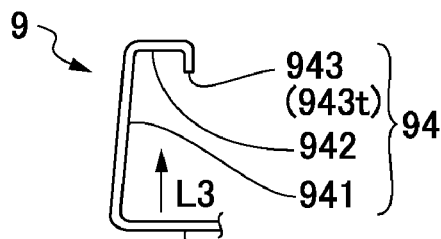
Figure 9C:
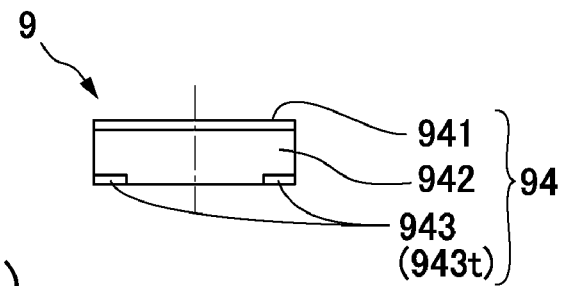
Figure 9D:
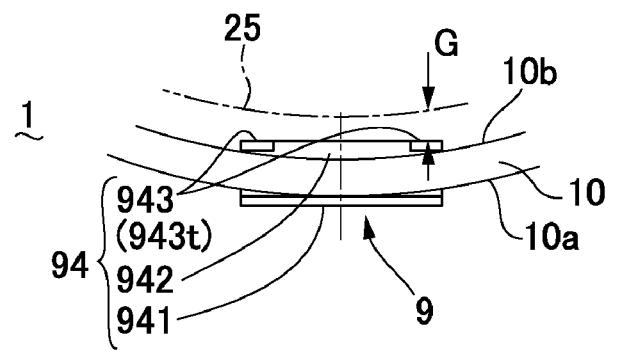
Figure 10A:
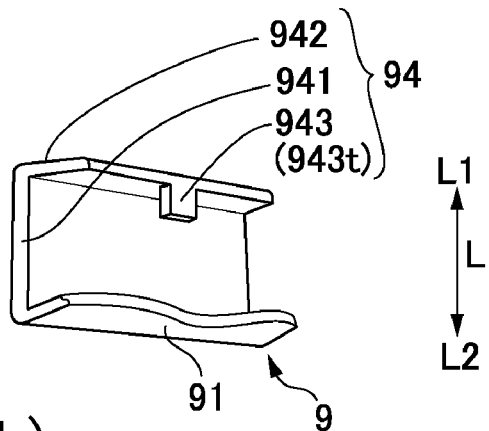
FIGS. 10(a), 10(b), 10(c) and 10(d) are explanatory views showing an urging member of a motor in accordance with a third embodiment of the present invention.
Figure 10B:
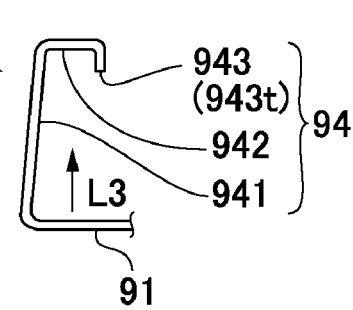
Figure 10C:
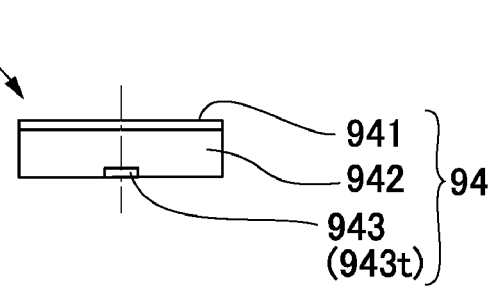
Figure 10D:
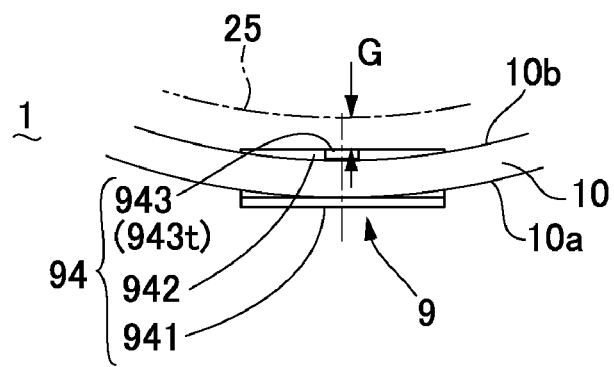
Figure 11A:
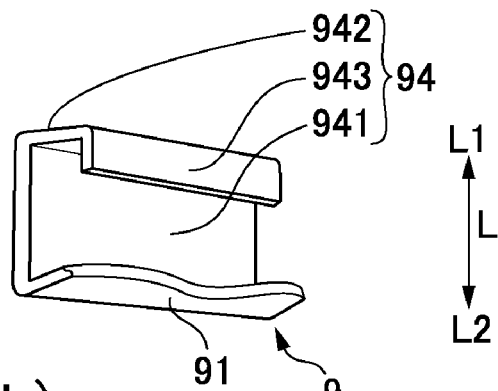
FIGS. 11(a), 11(b), 11(c) and 11(d) are explanatory views showing an urging member of a motor in accordance with a fourth embodiment of the present invention.
Figure 11B:
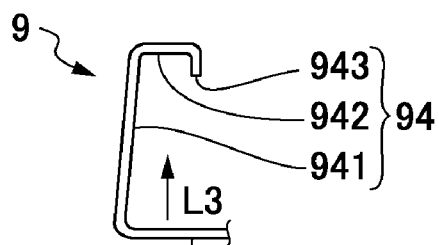
Figure 11C:
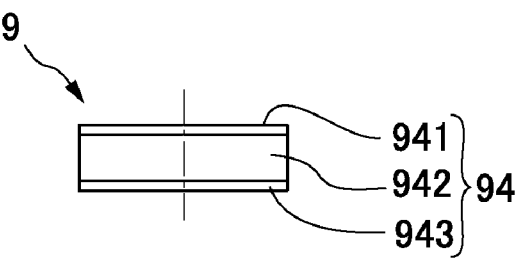
Figure 11D:
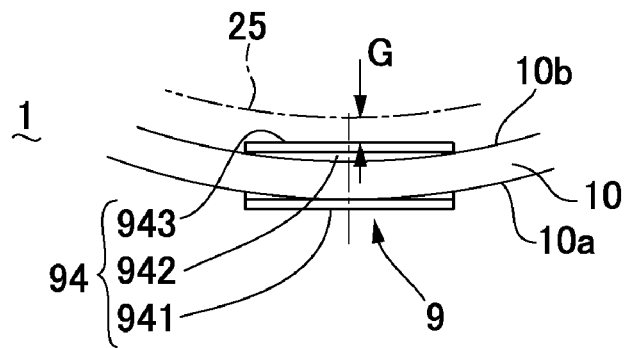
Figure 12A:
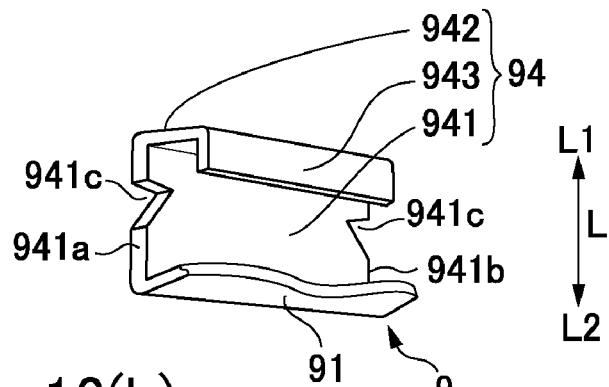
FIGS. 12(a), 12(b), 12(c) and 12(d) are explanatory views showing an urging member of a motor in accordance with a fifth embodiment of the present invention.
Figure 12B:
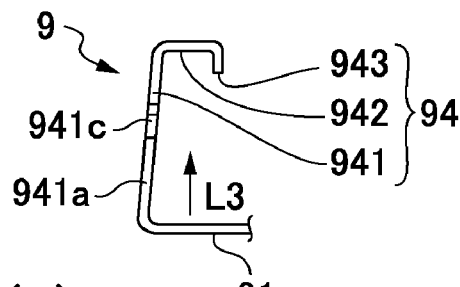
Figure 12C:
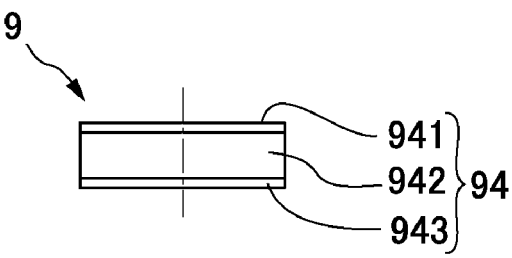
Figure 12D:
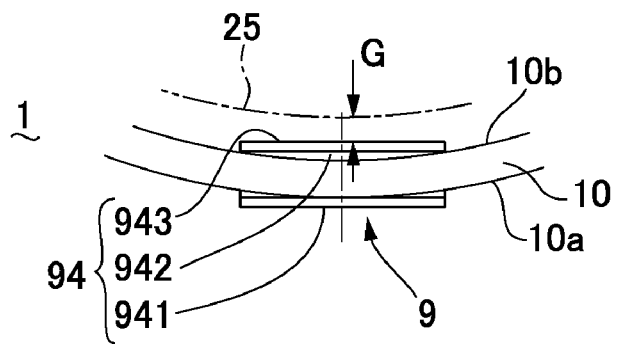
Figure 13:
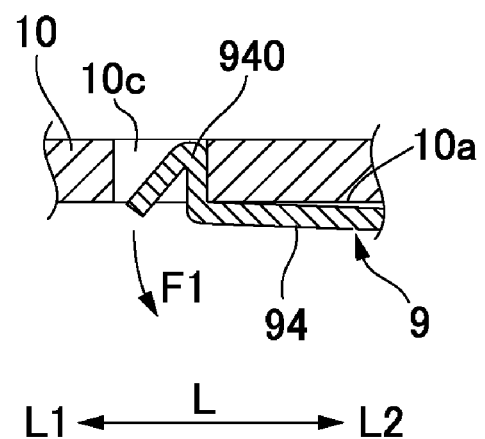
FIG. 13 is an explanatory view showing a fixing structure of an urging member to a motor main body in a conventional motor.

FIGS. 7(a), 7(b), 7(c) and 7(d) are explanatory views showing the urging member 9 of the motor 1 in FIGS. 1(a) and 1(b). FIG. 7(a) is a plan view showing the urging member 9, FIG. 7(b) is its partly cross sectional front view, FIG. 7(c) is its side view, and FIG. 7(d) is a bottom view of the urging member 9. FIGS. 8(a), 8(b), 8(c) and 8(d) are explanatory views showing a structure and the like on a tip end side of an engaging plate part 94 of the urging member 9 shown in FIGS. 7(a), 7(b), 7(c) and 7(d). FIG. 8(a) is a perspective view showing the engaging plate part 94 whose tip end side is viewed from the other side in the motor axial line "L" direction, FIG. 8(b) is a cross-sectional view showing the engaging plate part 94, FIG. 8(c) is an explanatory view showing the tip end side of the engaging plate part 94 which is viewed in a direction shown by the arrow "L3" in FIG. 8(b), and FIG. 8(d) is an explanatory view showing a state that a pawl part 943 of the engaging plate part 94 is engaged with an inner peripheral face 10b of the tube-like body part 10.

As shown in FIGS. 2(a) and 2(b), FIG. 4 and FIGS. 7(a) through 7(d), the urging member 9 is formed of a thin metal plate whose thickness is about 0.1-0.3 mm. The urging member 9 is provided with an end plate part 91 whose planar shape is formed so that four corners of a rectangle are cut out in a circular arc shape and the end plate part 91 is provided with substantially the same external shape as the bearing holding member 8. The plate spring part 90 is linearly cut and bent toward a side where the bearing holding member 8 is located at a center portion of the end plate part 91. The tip end portion of the plate spring part 90 is extended to a position displaced from the center of the through hole 80 of the bearing holding member 8 and is abutted at the position displaced from the center of the main body part 72 of the bearing 7. The shape of the plate spring part 90 may be appropriately changed and, in this embodiment, the plate spring part 90 is bent at a midway position so that its urging force and urging direction are adjusted.

The end plate part 91 of the urging member 9 is provided with reinforcing plate parts 98 which are slightly bent to a side of the bearing holding member 8 along edges of long side portions. The strength of the end plate part 91 is enhanced by the reinforcing plate parts 98 so that the end plate part 91 is not warped. Further, the end plate part 91 of the urging member 9 is formed with ribs 91a and 91b which are protruded to the other side "L2" in the motor axial line "L" direction on both sides interposing the plate spring part 90. The strength of the end plate part 91 is also enhanced by the ribs 91a and 91b so that the end plate part 91 is not warped.

Further, a pair of engaging plate parts 94 extending along the outer peripheral face 10a of the tube-like body part 10 (outer stator core 4B) is formed in two short side portions of the urging member 9 which are oppositely disposed to each other. On the other hand, the tube-like body part 10 in a cylindrical tube shape of the motor main body 1a is formed with an opening part 10c comprised of a rectangular hole whose side direction is directed in a circumferential direction at two positions oppositely disposed to each other so that the opening part 10c faces the outer peripheral face of the coil 25 which is wound around the first bobbin 2A. The two engaging plate parts 94 of the urging member 9 are respectively engaged with the two opening parts 10c in a one-for-one manner and thus the urging member 9 is fixed to the motor main body 1a.

In order to adopt the fixing structure described above, each of the two engaging plate parts 94 is provided with a side plate part 941, which is extended from the end plate part 91 along the outer peripheral face 10a of the tube-like body part 10 to the one side "L1" in the motor axial line "L" direction, and a hook part 942 which is bent at a tip end part of the side plate part 941 to an inner sided in a radial direction and is engaged with an end part 10e of the opening part 10c located on the other side "L2" in the motor axial line "L" direction. In a state before the urging member 9 is fixed to the motor main body 1a, the side plate part 941 is extended from the end plate part 91 in an inclined state by about 2° (degree) to the inner side and the hook part 942 is bent from the tip end part of the side plate part 941 so as to be parallel to the end plate part 91. In this embodiment, a dimension in the motor axial line "L" direction of the side plate part 941 is about 2-4 mm and a dimension in the radial direction of the hook part 942 is about 0.4-1 mm.

Further, each of the two engaging plate parts 94 is provided with a pawl part 943 which is bent at an angle of about 90° from the tip end part of the hook part 942 to the other side "L2" in the motor axial line "L" direction on the inner side 10d of the tube-like body part 10. A distance in the radial direction between the pawl part 943 and the side plate part 941 is substantially equal to a thickness dimension of the tube-like body part 10. Further, the pawl part 943 is connected with the hook part 942 with the same dimension in the circumferential direction and a dimension in the motor axial line "L" direction of the pawl part 943 is, for example, 0.3-0.7 mm.

The side plate part 941 and the hook part 942 are formed in a flat plate shape. On the other hand, the pawl part 943 is, as shown in FIG. 7(a) and FIGS. 8(a) through 8(d), provided with a circular arc shape which is curved along the inner peripheral face 10*b* of the tube-like body part 10 in the circumferential direction. Therefore, similarly to the pawl part 943, the inner peripheral end of the hook part 942 is also provided with a circular arc shape which is curved along the inner peripheral face 10*b* of the tube-like body part 10 in the circumferential direction. In this embodiment, a convex surface 943*a* of the pawl part 943 which is superposed on the inner peripheral face 10*b* of the tube-like body part 10 is formed in a circular arc face which is curved with substantially the same radius of curvature as the inner peripheral face 10*b* of the tube-like body part 10. For example, the radius of curvature of the convex surface 943*a* is 6-8 mm.

In order to fix the urging member 9 structured as described above to the motor main body 1*a*, first, a tip end part of one of the two engaging plate parts 94 of the urging member 9 is engaged with one of the two opening parts 10*c* of the tube-like body part 10 and the other engaging plate part 94 is pressed against the outer peripheral face 10*a* of the tube-like body part 10 in a state that the bearing holding member 8 and the bearing 7 are sandwiched by the end plate part 91 and an end face of the other side "L2" in the motor axial line "L" direction of the motor main body 1*a* (outer stator core 4A). As a result, the hook parts 942 of the engaging plate parts 94 are entered into the opening parts 10*c* and the hook parts 942 are elastically abutted with the end parts 10*e* of the opening parts 10*c* which are located on the other side "L2" in the motor axial line "L" direction. In this case, the thickness of the both outer side portions of the bearing holding member 8 is smaller than its center portions, in other words, the both outer side portions are formed to be inclined to the outer stator core 4A side and thus a portion of the outer side of the end plate part 91 which is connected with the side plate part 941 is separated from the bearing holding member 8, the outer stator core 4A and an end face of the tube-like body part 10 of the outer stator core 4B through a gap space. Therefore, the hook parts 942 of the engaging plate parts 94 are engaged with the tube-like body part 10 in the motor axial line "L" direction by utilizing a resiliently bending of the end plate part 91. In this case, as shown in FIG. 2(*b*) and FIG. 8(*d*), the pawl part 943 of the engaging plate part 94 is elastically engaged with the inner peripheral face 10*b* of the tube-like body part 10 and the engaging plate part 94 is also engaged with the tube-like body part 10 in the radial direction. In this state, the pawl parts 943 and the tube-like body part 10 become in a concentric state with each other. Accordingly, the pawl parts 943 become in a concentric state with an outer peripheral face of the coil 25 and a certain gap space "G" is formed between a concave surface 943*b* of the pawl part 943 and the outer peripheral face of the coil 25.

When the engaging plate parts 94 are engaged with the tube-like body part 10 of the motor main body 1*a* as described above, the bearing holding member 8 and the urging member 9 are held by the motor main body 1*a* and the plate spring part 90 of the urging member 9 urges the rotor 5 to the one side "L1" in the motor axial line "L" direction through the bearing 7. Therefore, rattling does not occur in the rotation shaft 51.

As described above, in the motor 1 in this embodiment, the opening part 10*c* is provided in the tube-like body part 10 of the motor main body 1*a* and the urging member 9 is provided with the engaging plate parts 94 which are extended toward the one side "L1" in the motor axial line "L" direction along the outer peripheral face 10*a* of the tube-like body part 10. The tip end sides of the engaging plate parts 94 are engaged with the opening parts 10*c* and the urging member 9 is attached to the motor main body 1*a*. The engaging plate part 94 is provided with the hook part 942, which is bent to the inner side in the radial direction from the tip end part of the side plate part 941 and is engaged with the end part 10*e* of the opening part 10*c* located on the other side "L2" in the motor axial line "L" direction, and the pawl part 943 which is bent to the other side "L2" in the motor axial line "L" direction from the tip end part of the hook part 942 on the inner side of the tube-like body part 10. Therefore, the hook parts 942 of the engaging plate parts 94 of the urging member 9 are engaged with the tube-like body part 10 in the motor axial line "L" direction and the pawl parts 943 are engaged with the tube-like body part 10 in the radial direction. Accordingly, even when the engaging plate part 94 is deformed to the outer side due to an impact which is applied from the outer side, the pawl part 943 is engaged with the inner peripheral face 10*b* of the tube-like body part 10 and thus the engaging plate part 94 engaged with the opening part 10*c* is hard to be disengaged. For example, when an impact is applied to the rotor 5 to the other side "L2" in the motor axial line "L" direction, the end plate part 91 of the urging member 9 is pressed to the other side "L2" in the motor axial line "L" direction and, as a result, the hook part 942 may be deformed so as to be opened to the outer side. However, even in this case, the pawl part 943 is engaged with the inner peripheral face 10*b* of the tube-like body part 10 and thus the engaging plate part 94 engaged with the opening part 10*c* is hard to be disengaged. Especially, in this embodiment, the entire convex surface 943*a* of the pawl part 943 is engaged with the inner peripheral face 10*b* of the tube-like body part 10 in the circumferential direction and thus the engaging plate part 94 engaged with the opening part 10*c* is hard to be disengaged. Therefore, the impact resistance performance of the motor is enhanced to about 500 G.

Further, the pawl part 943 is connected with the hook part 942 with the same dimension as the hook part 942 in the circumferential direction and its dimension in the circumferential direction is large. Therefore, even when a torsional force is applied to the engaging plate part 94, engagement of the pawl part 943 with the tube-like body part 10 is hard to be disengaged.

In addition, the pawl part 943 is provided with a circular arc shape which is curved in the circumferential direction along the inner peripheral face 10*b* of the tube-like body part 10 and, when the pawl part 943 is engaged with the tube-like body part 10, as shown in FIG. 8(*d*), the pawl part 943 becomes in a concentric state with the inner peripheral face 10*b* of the tube-like body part 10 and the outer peripheral face of the coil 25. Therefore, a gap space "G" is formed between the concave surface 943*b* of the pawl part 943 and the outer peripheral face of the coil 25 and thus the pawl part 943 and the coil 25 are not contacted with each other. Further, the gap space "G" is set in a distance so that the pawl part 943 is not abutted with the outer peripheral face of the coil 25 even when the pawl part 943 is to be engaged with the inner peripheral face 10*b* of the tube-like body part 10 through the opening part 10*c*.

[Second Embodiment]

FIGS. 9(*a*), 9(*b*), 9(*c*) and 9(*d*) are explanatory views showing an urging member 9 of a motor 1 in accordance with a second embodiment of the present invention. FIG. 9(*a*) is a perspective view showing an engaging plate part 94 whose tip end side is viewed from the other side in the motor axial line "L" direction, FIG. 9(*b*) is a cross-sectional view showing the engaging plate part 94, FIG. 9(*c*) is an explanatory view showing the engaging plate part 94 whose tip end side is viewed in a direction shown by the arrow "L3" in FIG. 9(*b*), and FIG. 9(*d*) is an explanatory view showing a state that the pawl part 943 of the engaging plate part 94 is engaged with the inner peripheral face 10*b* of the tube-like body part 10. The basic structure in the second embodiment is similar to the first embodiment and thus the same reference signs are used to common portions and their descriptions are omitted.

In the first embodiment, the pawl part 943 of the urging member 9 is connected with the hook part 942 in the same dimension as the hook part 942 in the circumferential direction. However, in the second embodiment, as shown in FIGS. 9(*a*) through 9(*d*), the pawl part 943 is partly formed in the circumferential direction in the tip end part of the hook part 942. More specifically, the pawl part 943 is comprised of two protruded parts 943*t* which are respectively formed on both end parts in the circumferential direction in the tip end part of the hook part 942.

Even in the urging member 9 structured as described above, as shown in FIG. 9(*d*), when the tip end part of the engaging plate part 94 is engaged with the opening part 10*c* of the tube-like body part 10, the hook part 942 is elastically abutted with the end part 10*e* of the opening part 10*c* which is located on the other side "L2" in the motor axial line "L" direction and the pawl part 943 is engaged with the inner peripheral face 10*b* of the tube-like body part 10. Therefore, the engaging plate part 94 is engaged with the tube-like body part 10 in the motor axial line "L" direction and in the radial direction. Further, the pawl part 943 is comprised of two protruded parts 943*t* which are formed at end parts of the tip end part of the hook part 942 and the protruded parts 943*t* are sufficiently separated from each other in the circumferential direction. Therefore, even when a torsional force is applied to the engaging plate part 94, engagement of the pawl part 943 with the tube-like body part 10 is hard to be disengaged.

[Third Embodiment]

FIGS. 10(*a*), 10(*b*), 10(*c*) and 10(*d*) are explanatory views showing an urging member 9 of a motor 1 in accordance with a third embodiment of the present invention. FIG. 10(*a*) is a perspective view showing an engaging plate part 94 whose tip end side is viewed from the other side in the motor axial line "L" direction, FIG. 10(*b*) is a cross-sectional view showing the engaging plate part 94, FIG. 10(*c*) is an explanatory view showing the engaging plate part 94 whose tip end side is viewed in a direction shown by the arrow "L3" in FIG. 10(*b*), and FIG. 10(*d*) is an explanatory view showing a state that the pawl part 943 of the engaging plate part 94 is engaged with the inner peripheral face 10*b* of the tube-like body part 10. The basic structure in the third embodiment is similar to the first embodiment and thus the same reference signs are used to common portions and their descriptions are omitted.

In the second embodiment, as an example that the pawl part 943 is partly formed at the tip end part of the hook part 942 in the circumferential direction, two protruded parts 943*t* as the pawl part 943 are provided at both end parts of the tip end part of the hook part 942. However, in the third embodiment, the pawl part 943 is structured of one protruded part 943*t* which is provided at a center in the circumferential direction of the tip end part of the hook part 942.

Even in the urging member 9 structured as described above, as shown in FIG. 10(*d*), when the tip end part of the engaging plate part 94 is engaged with the opening part 10*c* of the tube-like body part 10, the hook part 942 is elastically abutted with the end part 10*e* of the opening part 10*c* which is located on the other side "L2" in the motor axial line "L" direction and the pawl part 943 is engaged with the inner peripheral face 10*b* of the tube-like body part 10. Therefore, the engaging plate part 94 is engaged with the tube-like body part 10 in the motor axial line "L" direction and in the radial direction. Further, the pawl part 943 is comprised of one protruded part 943*t* which is formed at the center of the tip end part of the hook part 942. Therefore, even when a dimension of the hook part 942 which is extended to the inner side with respect to the inner peripheral face 10*b* of the tube-like body part 10 is small, the protruded part 943*t* (pawl part 943) is capable of being engaged with the inner peripheral face 10*b* of the tube-like body part 10. Accordingly, a sufficient gap space "G" is formed between the pawl part 943 and the outer peripheral face of the coil 25 and thus the pawl part 943 and the coil 25 are not contacted with each other.

[Fourth Embodiment]

FIGS. 11(*a*), 11(*b*), 11(*c*) and 11(*d*) are explanatory views showing an urging member 9 of a motor 1 in accordance with a fourth embodiment of the present invention. FIG. 11(*a*) is a perspective view showing an engaging plate part 94 whose tip end side is viewed from the other side in the motor axial line "L" direction, FIG. 11(*b*) is a cross-sectional view showing the engaging plate part 94, FIG. 11(*c*) is an explanatory view showing the engaging plate part 94 whose tip end side is viewed in a direction shown by the arrow "L3" in FIG. 11(*b*), and FIG. 11(*d*) is an explanatory view showing a state that the pawl part 943 of the engaging plate part 94 is engaged with the inner peripheral face 10*b* of the tube-like body part 10. The basic structure in the fourth embodiment is similar to the first embodiment and thus the same reference signs are used to common portions and their descriptions are omitted.

In the first embodiment, the pawl part 943 of the urging member 9 is formed in a curved shape. However, in the fourth embodiment, as shown in FIGS. 11(*a*) through 11(*d*), the pawl part 943 which is formed in a flat plate shape is connected with the hook part 942 with the same dimension as the hook part 942.

Even in the urging member 9 structured as described above, as shown in FIG. 11(*d*), when the tip end part of the engaging plate part 94 is engaged with the opening part 10*c* of the tube-like body part 10, the hook part 942 is elastically abutted with the end part 10*e* of the opening part 10*c* which is located on the other side "L2" in the motor axial line "L" direction and the pawl part 943 is engaged with the inner peripheral face 10*b* of the tube-like body part 10. Therefore, the engaging plate part 94 is engaged with the tube-like body part 10 in the motor axial line "L" direction and in the radial direction. Further, the pawl part 943 which is formed in a flat plate shape is connected with the hook part 942 with the same dimension as the hook part 942 and thus the both end parts in the circumferential direction are engaged with the inner peripheral face 10*b* of the tube-like body part 10. Therefore, even when a torsional force is applied to the engaging plate part 94, engagement of the pawl part 943 with the tube-like body part 10 is hard to be disengaged. Further, all of the side plate part 941, the hook part 942 and the pawl part 943 of the engaging plate part 94 are formed in a flat plate shape and thus the engaging plate part 94 is easily worked.

[Fifth Embodiment]

FIGS. 12(*a*), 12(*b*), 12(*c*) and 12(*d*) are explanatory views showing an urging member 9 of a motor 1 in accordance with a fifth embodiment of the present invention. FIG. 12(*a*) is a perspective view showing an engaging plate part 94 whose tip end side is viewed from the other side in the motor axial line "L" direction, FIG. 12(*b*) is a cross-sectional view showing the engaging plate part 94, FIG. 12(*c*) is an explanatory view showing the engaging plate part 94 whose tip end side is viewed in a direction shown by the arrow "L3" in FIG. 12(*b*), and FIG. 12(*d*) is an explanatory view showing a state that the pawl part 943 of the engaging plate part 94 is engaged with the inner peripheral face 10*b* of the tube-like body part 10. The basic structure in the fifth embodiment is similar to the first embodiment and thus the same reference signs are used to common portions and their descriptions are omitted.

In the first through the fourth embodiments, in the engaging plate part 94 of the urging member 9, both side edges of the side plate part 941 are formed in a straight line shape but, in the fifth embodiment, as shown in FIG. 12(*a*), cut-out parts 941*c* are formed on side edges 941*a* and 941*b* of the side plate part 941. In this embodiment, the cut-out part 941*c* is formed in a triangular shape.

Even in the urging member 9 structured as described above, as shown in FIG. 12(*d*), when the tip end part of the engaging plate part 94 is engaged with the opening part 10*c* of the tube-like body part 10, the hook part 942 is elastically abutted with the end part 10*e* of the opening part 10*c* which is located on the other side "L2" in the motor axial line "L" direction and the pawl part 943 is engaged with the inner peripheral face 10*b* of the tube-like body part 10. Therefore, the engaging plate part 94 is engaged with the tube-like body part 10 in the motor axial line "L" direction and in the radial direction. Accordingly, even when the engaging plate part 94 is resiliently bent to the outer side, engagement of the engaging plate part 94 with the tube-like body part 10 is hard to be disengaged.

In a case of that the motor 1 is to be reworked, considerable labor is required to detach the engaging plate part 94 from the tube-like body part 10. However, in the fifth embodiment, cut-out parts 941*c* are formed on the side edges 941*a* and 941*b* of the side plate part 941. Therefore, when the motor 1 is to be reworked, a jig is engaged with the cut-out parts 941*c* of the engaging plate part 94 to forcibly make the engaging plate part 94 resiliently bend to an outer side. Accordingly, the engagement of the engaging plate part 94 with the opening part 10*c* is released. In the fifth embodiment, the cut-out part 941*c* is formed in the engaging plate part 94 of the motor 1 in accordance with the fourth embodiment. However, the cut-out part 941*c* may be formed in the engaging plate part 94 of the motor 1 in accordance with the first through third embodiments.

[Other Embodiments]

In the first through fifth embodiments, the tube-like body part 10 structuring the outer peripheral face of the motor main body 1*a* is integrally formed with the outer stator core 4B. However, the present invention may be applied to a case that the tube-like body part 10 is formed of a motor case which is separately formed from the outer stator core 4B. Further, in the first through fifth embodiments, the opening part 10*c* is formed in the tube-like body part 10 at a position facing the outer peripheral face of the coil 25 which is wound around the first bobbin 2A. However, the opening part 10*c* may be formed in the tube-like body part 10 at a position facing the outer peripheral face of the coil 25 which is wound around the second bobbin 2B.

Further, in the embodiments described above, the engaging plate parts 94 and the opening parts 10*c* are respectively provided at two positions. However, the engaging plate parts 94 and the opening parts 10*c* may be provided at three or more positions, for example, at four positions.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a motor main body comprising a rotor having a rotation shaft and a stator disposed on an outer peripheral side of the rotor; and
   an urging member configured to urge the rotor to one side in a motor axial line direction;
   wherein a tube-like body part structuring an outer peripheral face of the motor main body is formed with an opening part which is opened toward an outer side in a radial direction;
   wherein the urging member comprises:
   an end plate part which is provided with a plate spring part configured to urge the rotor and is located on the other side with respect to the tube-like body part in the motor axial line direction; and
   an engaging plate part which is extended toward the one side in the motor axial line direction from the end plate part along an outer peripheral face of the tube-like body part; and
   wherein the engaging plate part comprises:
   a side plate part which is extended from the end plate part toward the one side in the motor axial line direction along the outer peripheral face of tube-like body part;
   a hook part which is bent from a tip end part of the side plate part to an inner side in a radial direction and is engaged with a wall face of the opening part located on the other side in the motor axial line direction; and
   a pawl part which is bent from a tip end part of the hook part toward the other side in the motor axial line direction on an inner side of the tube-like body part.

2. The motor according to claim 1, wherein the opening part and the engaging plate part are respectively provided at plural positions separated from each other in a circumferential direction.

3. The motor according to claim 2, wherein the pawl part is curved in the circumferential direction along an inner peripheral face of the tube-like body part.

4. The motor according to claim 3, wherein the pawl part is concentrically curved with the inner peripheral face of the tube-like body part.

5. The motor according to claim 2, wherein the pawl part is partly formed in the tip end part of the hook part in the circumferential direction.

6. The motor according to claim 5, wherein the pawl part is formed at a center position in the circumferential direction of the tip end part of the hook part.

7. The motor according to claim 5, wherein the pawl part is formed at both end parts in the circumferential direction of the tip end part of the hook part.

8. The motor according to claim 1, further comprising a cut-out part which is formed on a side edge of the side plate part.

9. The motor according to claim 1, wherein
   the pawl part is partly or entirely formed in a circumferential direction of the tip end part of the hook part, and
   the pawl part is prevented from being disengaged by an inner peripheral face of the tube-like body part.

10. The motor according to claim 9, wherein
    the stator comprises a bobbin around which a coil is wound,
    the opening part formed in the tube-like body part is formed at a position located on an outer peripheral face of the coil wound around the bobbin, and
    a gap space is formed between the pawl part of the engaging plate part and the outer peripheral face of the coil in a state that the hook part of the engaging plate part is engaged with the opening part of the tube-like body part.

11. The motor according to claim 10, wherein the tube-like body part is integrally formed with a stator core which is used in the stator.

12. The motor according to claim 11, wherein
the stator is structured so that a first bobbin and a second bobbin around each of which a coil is wound are superposed on each other in the motor axial line direction,
the stator core of the stator is structured so that a plurality of pole teeth of an inner stator core and an outer stator core is juxtaposed to each other in the circumferential direction on respective inner peripheral sides of the first bobbin and the second bobbin,
the outer stator core disposed on the one side in the motor axial line direction is formed so that the other side in the motor axial line direction of the outer stator core is opened to be an open end and is formed as a cup-shaped outer stator core having the tube-like body part which covers an outer peripheral side of the first bobbin and the second bobbin,
the outer stator core disposed on the other side in the motor axial line direction is disposed so as to close the open end of the cup-shaped outer stator core, and
the opening part is provided in the tube-like body part of the cup-shaped outer stator core.

13. The motor according to claim 10, wherein
the rotation shaft is supported by a bearing which is movably held by a through hole of a bearing holding member in the motor axial line direction,
the bearing holding member is disposed so that at least a part of the bearing holding member is overlapped with the stator in the motor axial line direction, and
the end plate part of the urging member is abutted with the bearing holding member on an inner side in a radial direction with respect to the rotation shaft and, on an outer side in the radial direction, a gap space is formed between the bearing holding member and the stator in the motor axial line direction.

* * * * *